US012628804B2

(12) United States Patent　　　(10) Patent No.:　US 12,628,804 B2

Carlos　　　　　　　　　　　　　　(45) Date of Patent:　　May 19, 2026

(54) FISHING LURE WITH BAIT COMPARTMENT AND METHOD OF USE

(71) Applicant: Emmanuel Carlos, Ramona, CA (US)

(72) Inventor: Emmanuel Carlos, Ramona, CA (US)

( * ) Notice: Subject to any disclaimer, the term of this patent is extended or adjusted under 35 U.S.C. 154(b) by 0 days.

(21) Appl. No.: 19/035,730

(22) Filed: Jan. 23, 2025

(65) Prior Publication Data

US 2025/0234848 A1　　Jul. 24, 2025

Related U.S. Application Data

(60) Provisional application No. 63/624,143, filed on Jan. 23, 2024.

(51) Int. Cl.
　A01K 85/01　　　　(2006.01)

(52) U.S. Cl.
　CPC ................................. A01K 85/018 (2022.02)

(58) Field of Classification Search
　CPC .................................................... A01K 85/018
　USPC ........................................................ 42/42.06
　See application file for complete search history.

(56) References Cited

U.S. PATENT DOCUMENTS

| | | | |
|---|---|---|---|
| 2,112,385 A | | 3/1938 | Smith |
| 2,181,317 A | * | 11/1939 | Fernstrom ............. F16B 45/035 |
| | | | 24/598.5 |
| 3,280,497 A | * | 10/1966 | Tschida ................... A01K 85/16 |
| | | | D22/132 |
| 4,047,317 A | * | 9/1977 | Pfister .................... A01K 85/01 |
| | | | 43/42.06 |

| | | | |
|---|---|---|---|
| 4,161,841 A | * | 7/1979 | Holstein ................. A01K 91/08 |
| | | | 43/42.23 |
| 4,550,521 A | | 11/1985 | Hayden |
| 4,553,348 A | | 11/1985 | Cooper |
| 4,637,160 A | * | 1/1987 | Biskup ................... A01K 85/14 |
| | | | 43/42.5 |
| 5,067,270 A | | 11/1991 | Garrick |
| 5,526,602 A | * | 6/1996 | Day, Sr. ................. A01K 85/01 |
| | | | 43/37 |
| 5,560,140 A | * | 10/1996 | Nafziger, Jr. .......... A01K 85/01 |
| | | | 43/42.22 |
| 5,595,015 A | * | 1/1997 | Jensen ................... A01K 85/01 |
| | | | 43/42.19 |
| 6,557,293 B2 | | 5/2003 | Klapka |
| 6,588,138 B1 | * | 7/2003 | Gilbert ................... A01K 85/01 |
| | | | 43/42 |
| 6,922,937 B1 | | 8/2005 | Gilbert |
| 7,028,430 B2 | * | 4/2006 | Gironda ................. A01K 85/14 |
| | | | 43/42.22 |
| 7,174,669 B1 | | 2/2007 | Kallas |
| 8,402,687 B1 | * | 3/2013 | Jarrell ................... A01K 85/00 |
| | | | 43/42.28 |

(Continued)

OTHER PUBLICATIONS https://www.yakimabait.com/product-category/spinfish/; Yakima Bait/ Scent-holding UV Trolling Plug Fish Devour; Oct. 20, 2025.

*Primary Examiner* — Christopher P Ellis

(74) *Attorney, Agent, or Firm* — The Inventor's Friend Patent Law Firm, P.L.L.C.; Nathaniel A. Wickliffe

(57)　　　　　　　　ABSTRACT

A fishing lure can have a bait compartment and a slidable lid. The slidable lid can be moved back and forth in a single dimension between an open position and a closed position when a user applies force to the lid in the single dimension. A ball detent can hold the lid in the closed position, and the ball detent can be overcome to open the lid through the application of force in the single dimension.

12 Claims, 13 Drawing Sheets

(56)     References Cited

U.S. PATENT DOCUMENTS

| | | | | |
|---|---|---|---|---|
| 8,474,174 | B2 | 7/2013 | Norman | |
| 9,155,291 | B1 * | 10/2015 | Russ | A01K 97/04 |
| 9,538,736 | B1 * | 1/2017 | McNatt | A01K 85/01 |
| 11,889,824 | B2 * | 2/2024 | Henderson | A01K 85/029 |
| 2006/0005456 | A1 * | 1/2006 | Harris | A01K 91/06 |
| | | | | 43/42.06 |
| 2006/0218848 | A1 * | 10/2006 | Melhorn | A01K 91/06 |
| | | | | 43/44.99 |
| 2016/0057982 | A1 * | 3/2016 | Slocum | A01K 85/18 |
| | | | | 43/42.06 |
| 2022/0095600 | A1 * | 3/2022 | Gillihan | A01K 97/05 |
| 2025/0234848 | A1 * | 7/2025 | Carlos | A01K 85/01 |

* cited by examiner

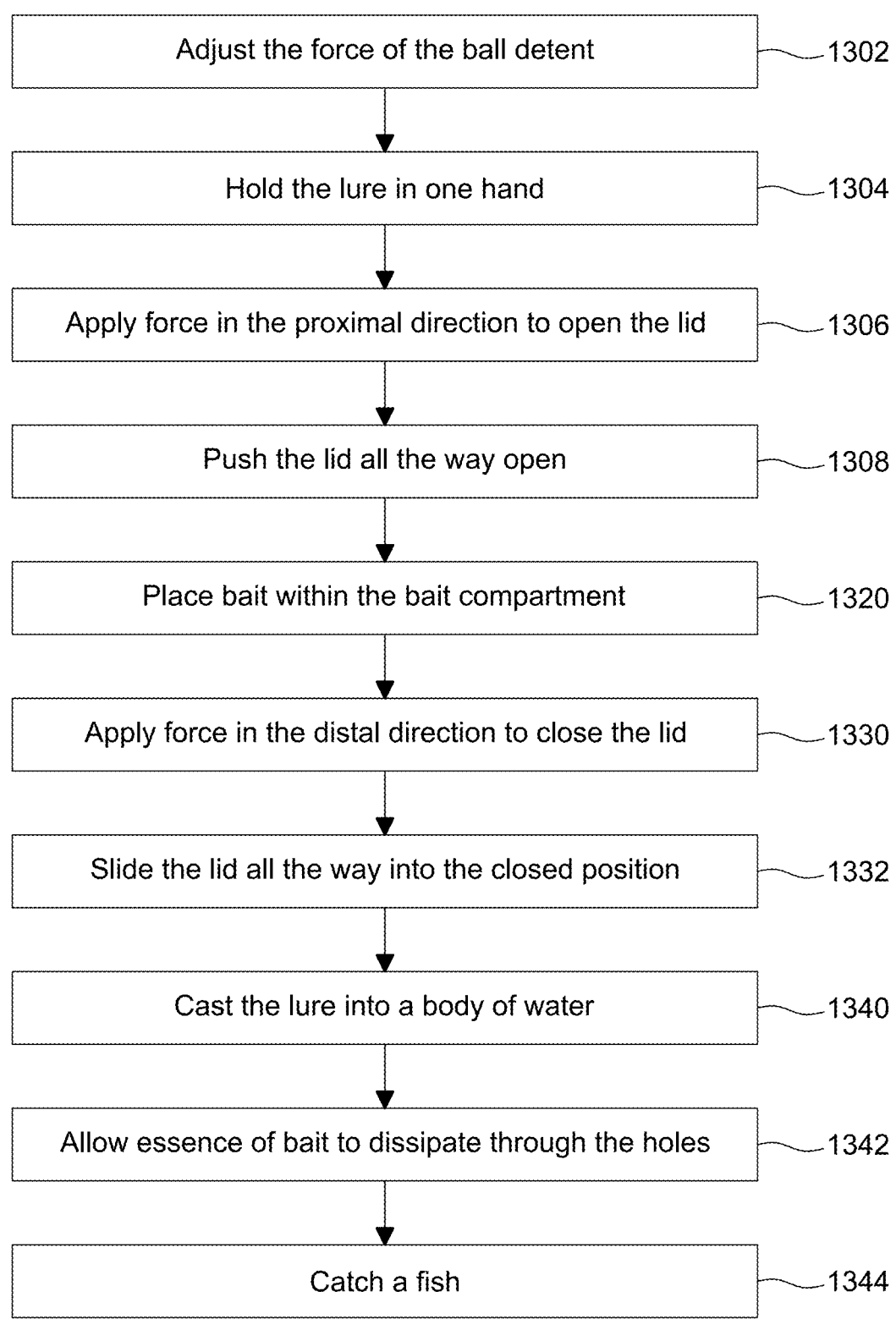

Adjust the force of the ball detent —1302

Hold the lure in one hand —1304

Apply force in the proximal direction to open the lid —1306

Push the lid all the way open —1308

Place bait within the bait compartment —1320

Apply force in the distal direction to close the lid —1330

Slide the lid all the way into the closed position —1332

Cast the lure into a body of water —1340

Allow essence of bait to dissipate through the holes —1342

Catch a fish —1344

FIG. 13

FISHING LURE WITH BAIT COMPARTMENT AND METHOD OF USE

FIELD OF THE INVENTION

This application relates to the field of fishing lures, and more particularly to the field of lures with internal compartments.

BACKGROUND OF THE INVENTION

Existing types of common fishing lures use a design that simulates the appearance or presence of a prey fish. This is typically achieved by mimicking the colors, movement, sound or vibrations of a smaller fish. Most lures are equipped with one or more sets of hooks that are used to secure the fish on the line. Natural or artificial bait can be placed on the hooks to help attract and catch fish. When bait is placed on the hooks it may be at risk of falling off or being pulled off by a predator fish. This can be attributed to the open exposure of the bait on the hook.

Various historical fishing lures have attempted to overcome this problem by storing the bait within the lure itself. However, this creates a new set of problems. Fishing lures are used in wet environments, and many, if not all, of the various possible baits used by fisherman are wet, slimy, slippery, or otherwise difficult to securely hold and control. By way of non-limiting examples, this can include various smaller fish, smaller portions of fish, worms, rotten or strong-smelling food items, specially manufactured baits, and others. For most of these baits, a common feature is a strong odor or taste that can be carried in the water to attract game fish. Many of these baits that are intended to release strong smells or tastes into the water without dissolving or falling apart after being introduced into the water often start out wet, slippery, slimy, or otherwise difficult to securely hold and control.

Furthering the problem, the portions of the general population that are anecdotally thought to have the most free time for pastimes such as fishing include children and elderly adults. Unfortunately, both of these populations may suffer from increased rates of reduced dexterity compared to the general population. Trying to affix bait to a hook can be difficult for anyone, but particularly so for the populations that may have the most free time for fishing. Trying to get wet and slippery lures with bait compartments open while managing the wet and slippery bait, getting the bait into the lure's internal compartment, and closing the bait compartment of existing lures can be frustratingly difficult. Lures with bait compartments today currently require two hands to disassemble them, pivot them open, unlock latches, or other cumbersome and inconvenient ways to open them and then get them closed again after bait has been loaded into the bait compartment.

What is needed is a lure with a bait compartment that can easily be opened and closed with one hand while the other hand manages and loads the bait into the compartment. Preferably a lure can have simple movements and easy operation so that small or weak child's hands and trembly or arthritic elderly hands can easily operate the lure to open and close the compartment with one hand.

SUMMARY OF THE INVENTION

This invention overcomes disadvantages of the prior art by providing a system and method that allow bait to be quickly and easily loaded into a fishing lure. The system and method described herein provide a lure with a bait compartment that can be operated easily with just one hand, and can even be operated easily by people with reduced dexterity or finger strength.

In an embodiment, a fishing lure can include a slidable lid, the slidable lid movable between an open position and a closed position, the slidable lid partially defining a bait compartment when the lid is in a closed position, and a lure body, the lure body further comprising a cavity, the cavity partially defining the bait compartment.

The slidable lid can be movable in only one dimension, and the slidable lid can be constrained from movement in five degrees of freedom. The lure can include a backstop configured to bound the movement of the slidable lid in a distal direction. The lure can include a frontstop configured to bound the movement of the slidable lid in the proximal direction, thereby bounding the movement of the slidable lid to a fixed region in one dimension, preventing the slidable lid from separating from the lure body. The fishing lure can include a ball detent, the ball detent configured to engage with a notch of the slidable lid when the slidable lid is in a closed position, thereby securing the slidable lid in the closed position. The fishing lure can include an adjustment screw that adjusts the strength of the ball detent. The slidable lid can include a grip adapted to allow a user to apply force along a proximal-distal direction. The fishing lure can include two tracks on either side of the bait compartment, the tracks holding the slidable lid in position above the front face of the lure.

In an embodiment, a method of loading bait into a lure can include holding the lure with only a first hand, sliding a slidable lid of the lure into an open position using a thumb of the first hand, thereby exposing a cavity of a bait compartment, inserting bait into the cavity with a second hand while the first hand continues to hold the lure, and sliding the slidable lid of the lure into a closed position using the thumb of the first hand, thereby enclosing the bait in the bait compartment.

Sliding the slidable lid of the lure into an open position can include applying a force to the slidable lid in a single dimension. Sliding the slidable lid into the open position can include applying force to the slidable lid in the single dimension to overcome a ball detent configured to hold the slidable lid in a closed position. Sliding the slidable lid into the closed position can include applying force to the slidable lid in the single dimension until a ball detent engages with a notch of the slidable lid to hold the slidable lid in a closed position.

A method of loading bait into a lure can include holding the lure, sliding a slidable lid of the lure into an open position by applying force in along a single dimension, thereby exposing a cavity of a bait compartment, inserting bait into the cavity, and sliding the slidable lid of the lure into a closed position by applying force along the single dimension, thereby enclosing the bait in the bait compartment.

Sliding the slidable lid into the open position can include applying force to the slidable lid in the single dimension to overcome a ball detent configured to hold the slidable lid in a closed position. Sliding the slidable lid into the closed position can include applying force to the slidable lid in the single dimension until a ball detent engages with a notch of the slidable lid to hold the slidable lid in a closed position. The method can include casting the lure into a body of water, allowing the essence of the bait to disseminate into the body of water, and reeling in a game fish attracted to the essence of the bait.

BRIEF DESCRIPTION OF THE DRAWINGS

The invention description below refers to the accompanying drawings, of which:

FIG. 13 shows a method of loading bait into a fishing lure, according to an illustrative embodiment.

DETAILED DESCRIPTION

Figure 1:
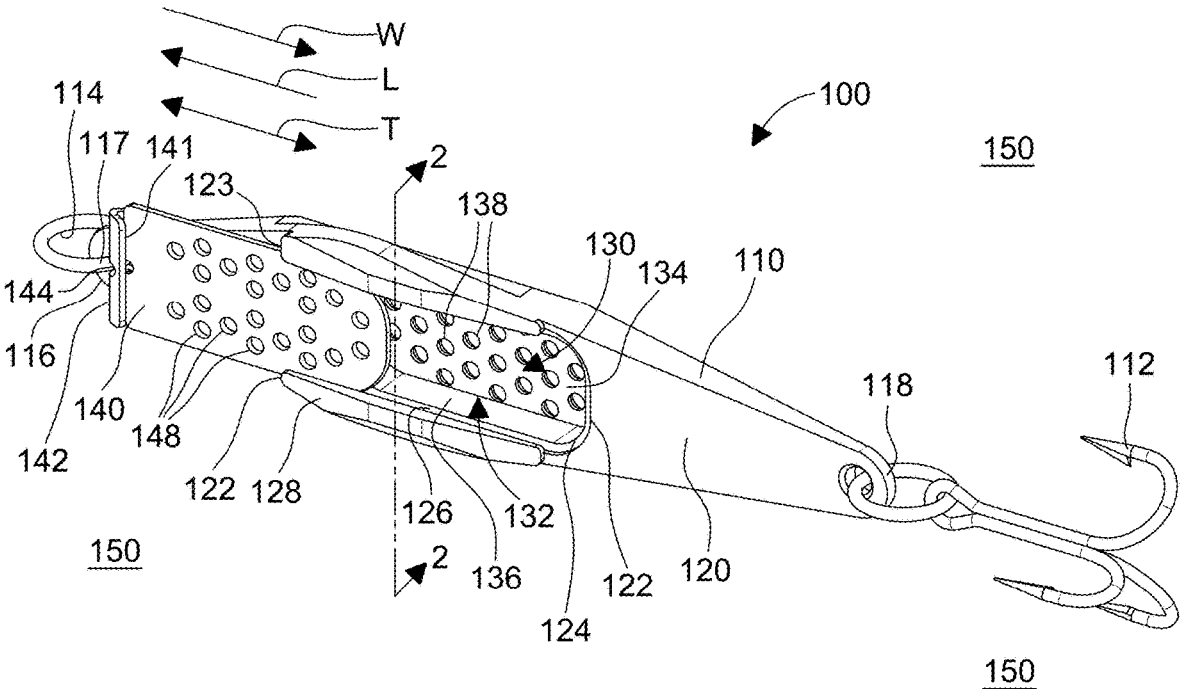
FIG. 1 is a perspective view of a fishing lure with a bait compartment, shown in a partially open conformation, according to an illustrative embodiment.

The description herein includes a novel fishing lure system and method of use. Although this invention is disclosed in the context of certain preferred embodiments and examples, it should be understood by those skilled in the art that the present invention extends beyond the specifically disclosed embodiments and/or uses of the invention and obvious modifications and equivalents thereof. Thus, it is intended that the scope of the present invention herein disclosed should not be limited by the particular disclosed embodiments described herein.

Various embodiments are discussed hereinafter. It should be noted that the figures are described only to facilitate the description of the embodiments. They are not intended as an exhaustive description of the invention and do not limit the scope of the invention. Additionally, any particular embodiment need not have all the aspects or advantages described herein. Thus, in various embodiments, any of the features described herein from different embodiments may be combined. It cannot be emphasized too strongly, however, that these are descriptions of implementations of the invention, and not descriptions of the invention, which is not limited to the detailed implementations described in this section but is described in broader terms in the claims. Further, the terms and phrases used herein are not intended to be limiting but rather to provide an understandable description of the invention.

Some embodiments illustrating the features of the invention will now be discussed in detail. The words "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

References to "one embodiment", "an embodiment", "another embodiment", "one example", "an example", "another example" and so on, indicate that the embodiment(s) or example(s) so described may include a particular feature, structure, characteristic, property, element, or limitation, but that not every embodiment or example necessarily includes that particular feature, structure, characteristic, property, element or limitation.

All illustrations of the drawings are for the purpose of describing selected versions of the present invention and are not intended to limit the scope of the present invention. The fishing lure described herein can be used to simulate the appearance or presence of a prey fish and features an internal compartment to retain and reduce the open exposure of fishing bait. Natural or artificial bait can be placed in the integrated compartment and the size can be scalable with the overall size of the fishing lure. An absorbent sponge soaked with the scent of natural or artificial bait can also be used in the compartment. Once bait is placed within the compartment a bait lid is closed to retain the bait. The bait lid and body of the Fishing Lure contain hole features that allow the scent of the bait to spread. The combined features of the Fishing Lure can simulate the appearance, presence and smell of a prey fish and can reduce the risk of bait loss.

FIG. 1 is a perspective view of a fishing lure with a bait compartment, shown in a partially open conformation, according to an illustrative embodiment. Fishing lure 100 can have a main body 110, one or more hooks 112, and an attachment point 114. Attachment point 114 can be configured to allow a user to attach the fishing lure 100 to a fishing line. The user can cast the fishing lure out into a body of water, and then can reel the fishing lure back towards the user. This process can be repeated until the fishing lure 100 attracts the attention of a game fish and the game fish attempts to bite the lure, thereby getting caught by the hook 112.

As the user reels the lure towards the user, the lure is moving in the direction of arrow L, into the water. At the same time, relative to the lure, the water 150 is moving in the direction of arrow W, from the head of the lure 116 at the proximal end of the lure towards the tail of the lure 118 at the distal end of the lure. In various embodiments, the water may be a still body of water such as a lake, and the lure can be pulled in the direction of arrow L so that the water is washing over the lure in the direction of arrow W, from the head 116 towards the tail 118. Although the water itself is still, the water is washing from head 116 to tail 118, relative to the moving lure. Similarly, in various embodiments, the lure may be used in a fast-moving river, where the lure may remain stationary for a period relative to the user, but relative to the water, the lure is moving in the direction of arrow L as the water is moving in the direction of arrow W.

Fishing lure 100 can have a backside (not shown) and a front face 120. Fishing lure 100 can have a bait compartment 130. Bait compartment 130 can be partially defined by a cavity 132 on the front side 120 of the fishing lure 100. In various embodiments, the cavity 132 can include a cavity floor 134 and cavity sidewalls 136, however, it should be clear that the shape of the bait compartment as shown in FIG. 1 is intended to be exemplary, and various shapes of the bait compartment are possible. The bait compartment can be partially defined by slidable lid 140. The slidable lid 140 can be moved in and out of place to cover the cavity.

The bait compartment 130 can have one or more perforations or holes that allow the essence of the bait, such as taste and/or smell, to escape from the bait compartment. In various embodiments, the bait compartment can have holes 138 in the cavity that allow the essence of the bait to escape to the water outside of the lure, and/or holes 148 in the lid that allow the essence of the bait to escape to the water outside of the lure. Holes 138 and/or 148 can be passages in communication between the inside of the bait compartment and the ambient air or water outside of the lure.

The lid 140 can be slid back and forth along a single dimension of travel between an open position and a closed position. The lid 140 has only one single degree of freedom of motion, and the entirety of the movement of the lid can be achieved by applying force along a single dimension, or along a single line. The lid can move back and forth along a single dimension of travel T, parallel to the lengthwise central axis A of the fishing lure 100. Direction of travel T can also be substantially parallel to the direction of lure movement arrow L and the direction of water movement arrow W. The lid can be free from swiveling motions and can be free from pivoting motions.

In an open conformation, as shown in FIG. 1, the lid has been slid in the direction of arrow L, opposite to the direction of arrow W, to expose the interior of the cavity. In a closed conformation, as shown in FIG. 3 and explained more fully below, the lid has been slid in the direction of arrow W into a position that covers the cavity and holds the bait within the bait compartment.

Figure 3:
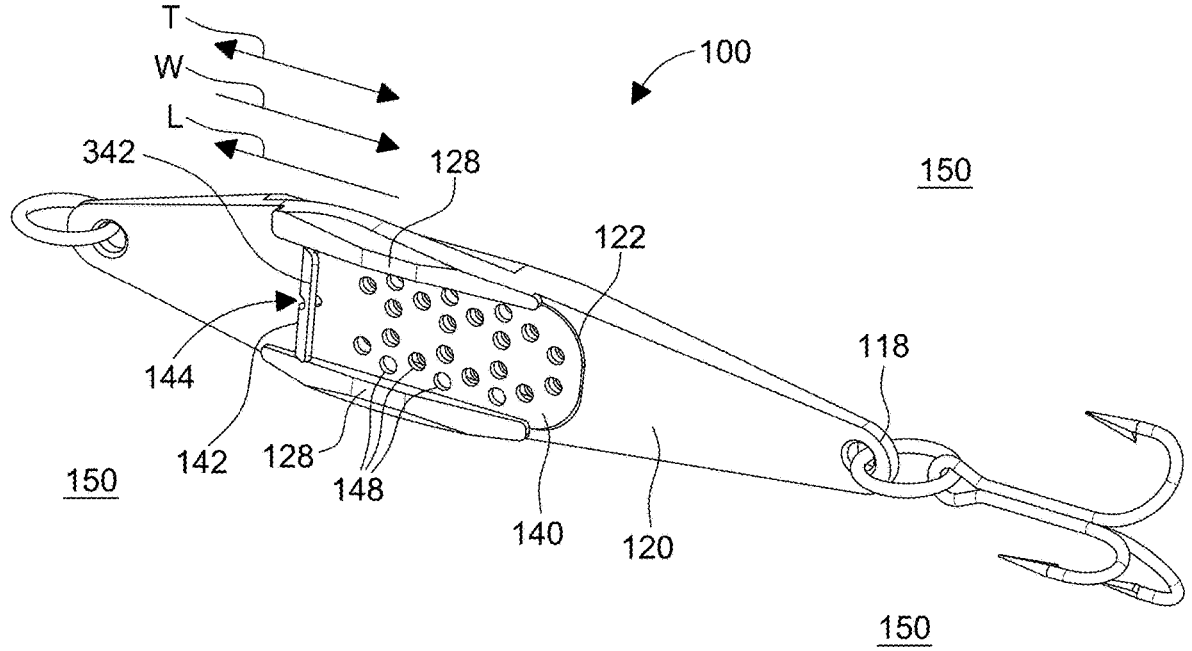
FIG. 3 is a perspective view of a fishing lure with a bait compartment shown in a closed conformation, according to an illustrative embodiment.

The lid 140 can have a grip 141 that the user can engage with to move the lid between an open position, as shown in FIG. 1, and a closed position, as shown in FIG. 3. In various embodiments, the grip 141 can be a lip 142 that can be a raised portion at the edge of the lid. Lip can be an extension of the lid that is folded back, extending up from the front of the lure. The lip is configured to transfer force into movement along the single line of dimension of travel T, thereby moving the lid back and for the along the dimension of travel T. Force applied to the lip in the direction of water movement arrow W can be transferred into movement of the lid into a closed position.

In various embodiments, the lure body 110 can have a backstop 122 that can limit the travel of the lid in the closing direction. That is to say, backstop 122 can stop the lid from moving too far towards the tail of the lure, so that the lid cannot move past the cavity in the closing direction. This prevents the lid from moving past the cavity and exposing the cavity by moving too far towards the tail. In various embodiments, the backstop 122 can be any raised feature that impedes the travel of the lid beyond a predetermined point in the direction of the water movement arrow W. Put another way, the backstop 122 can stop the lid from moving past the backstop in the distal direction.

In various embodiments, the backstop 122 can be a rim 124 that can at least partially surround the cavity. Rim 124 can at least partially surround the distal portion of the cavity, thereby preventing the lid from moving beyond the closed position in the direction of the water movement arrow W. Rim 122 can act as a backstop by stopping the distal end of the lid from moving past the rim in the distal direction.

In various embodiments, the backstop 122 can be the proximal end 123 of the track 128. The proximal end of the track can catch the lip and prevent the lid from moving beyond the closed position in the direction of the water movement arrow W. The track proximal end 123 can act as a backstop by stopping the lip 142 of the lid 140 from moving past the track proximal end 123 in the distal direction.

Figure 2:
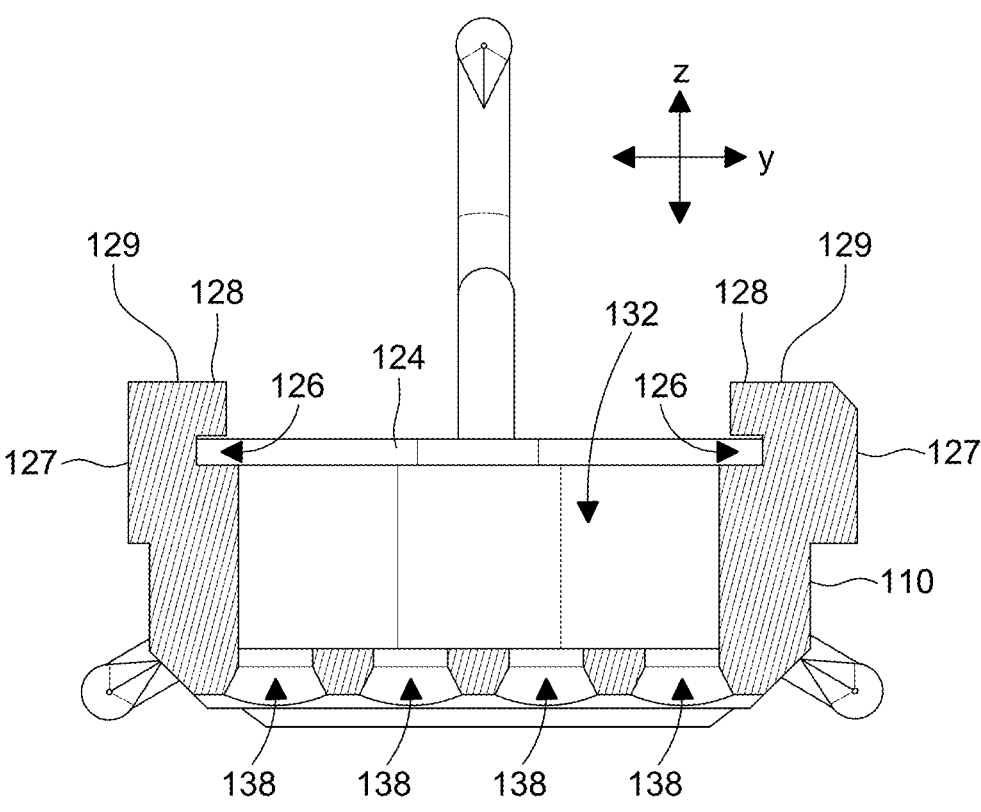
FIG. 2 is a cross-section view of the fishing lure of FIG. 1, taken along cross section line 2-2, according to an illustrative embodiment.

FIG. 2 is a cross-section view of the fishing lure of FIG. 1, taken along cross section line 2-2, according to an illustrative embodiment. Referring now to FIGS. 1 and 2, the lure body 110 can have slots 126 that can be defined by a track 128. That is to say, track 128 can define a groove, or slot 126, within the track 128. Lid 140 can slide within the slot 126, so that lid 140 can move back and forth across the front of the lure, between an open position as shown in FIG. 1 and a closed position as shown in FIG. 3. The track 128 can constrain the lid from moving in any direction outside of the single degree of freedom of movement shown by arrow T. That is to say, the trac prevent the lid from moving in any direction outside of the single degree of freedom of movement shown by arrow T. That is to say, the tracks sides 127 can constrain the lid from moving side to side in a lateral direction shown by arrow Y. The track upper bounds 129 can hold the lid onto the front side of the lure, thereby preventing it from moving in the anterior-posterior direction indicated by arrow Z. The lid can slide back and forth over the top of the front face of the lure, held in place by the tracks 128.

In various embodiments, the lure body 110 can include a frontstop 117 that can limit the travel of the lid in the opening direction. Frontstop 117 can stop the lid from moving too far towards the head of the lure, so that the lid cannot move outside of the slots 126. Put another way, the frontstop 117 prevents the lid from moving far enough in the proximal direction to fall out of the slots and become separated from the lure body. In various embodiments, the frontstop 117 can be any raised feature that impedes the travel of the lid beyond a predetermined point in the direction of the lure movement arrow L. In various embodiments, the frontstop can be the attachment point 114. Attachment point 114 can act as a frontstop by stopping the lid from moving past the attachment point in the proximal direction. As shown in the illustrative example of FIG. 1, the lid 140 is in the proximal-most position, and has reached the end of the bounded area of travel, with the notch 144 of the lid 140 engaged with the frontstop 117.

In various embodiments, the lip 142 of the lid 140 can have a notch 144 that is sized and located to mate with the frontstop 117. The lid can be pushed in the opening direction until the notch 144 meets the frontstop 117. The engagement of the frontstop 117 within the notch 144 can provide the user with a tactile indication that the lid has reached the end of its travels in the opening direction.

The lid 140 is constrained by track sides 127 from moving in a lateral direction along arrow Y, and the lid is constrained by the track upper bounds 129 and the lure front face 120 from moving in an anterior-posterior direction along arrow X. The lid is further constrained by the front face 120 and the track 128 from rotating or twisting in aa roll, yaw, or pitch direction. The lid is able to move in one degree of freedom, along arrow of travel T, however, the lid can be bounded by the frontstop and the endstop from moving outside of a predetermined range of travel. Put another way, the movement of the lid can be bound to a fixed region in a single dimension. The frontstop and the endstop can prevent the lid from moving beyond the track, so that the lid does not become separated from the lure body.

A user can hold the lure in one hand, and can easily push the lid back and forth with a single digit, such as a thumb. Because the lid is bounded in the one degree of freedom of motion, and constrained in the remaining 5 degrees of freedom of motion, a user can move the lid back and forth with a single digit, without needing to apply force in more than one direction, and without concern for the lid becoming separated from the lure body. This allows the user to operate the lure with one hand while managing and loading bait with the other hand. The user can open the lid by pushing the lid in the opening direction, with the lid reaching the proximal bound by abutting the frontstop, and the user can close the lid by pushing the lid in the closing direction, with the lid reaching the distal bound by abutting the backstop.

FIG. 3 is a perspective view of a fishing lure with a bait compartment shown in a closed conformation, according to an illustrative embodiment. The lid 140 has been slid into a closed position covering the cavity, so that the bait compartment can be closed. when the lure is in a closed conformation, the bait compartment can be defined by the cavity and the lid covering the cavity. In the closed position, the lid can abut the backstop 122, and the backstop 122 can prevent the lid from moving further in the distal direction towards the tail 118.

As the lure 100 moves in the direction of arrow L, relative to the water 150, the water 150 is moving in the direction of arrow W, relative to the lure 100. The flow of water can provide a force against the lip 142 of the lid 140. The force applied to the lip can provide a constant, gentle pressure that keeps the lid 122 in place against the backstop 122. The lip 142 can stick up away from the lure slightly, so that the lip can catch the water. Or, put another way, the water can impact the lip as the water washes over the lure, because the lip extends up and sticks out from the face of the lure.

The water can pass into the bait compartment and out of the bait compartment through the holes 148. Water can wash over the bait and then out into the ambient surrounding water, thereby carrying the essence of the bait out into the open ambient water, while the bait remains trapped safely inside of the bait compartment.

Having the bait locked inside of the bait compartment is good for keeping the bait from being separated from the lure, however, it can reduce the extent to which the essence of the bait is disseminated into the surrounding ambient water. Increasing the flow of water around the bait can beneficially increase the extent that the odor and taste of the bait is carried out into the surrounding ambient water, thereby increasing the likelihood of attracting game fish to bite the lure. In furtherance of effectively dissipating the essence of the bait, the lid can be somewhat loose and free from seals. Water can pass around the lid under the lid by passing around the edges of the lid. The edges of the lid may be free from forming a tight seal with the lure body. The lid can ride above the face of the lure, thereby allowing water to flow under the lid, and the lid can be held above the lid by the track 128.

The lid is not locked in place to the lure body, but is free from locks and is free from seals. This creates a number of benefits. The lid is more easily moved between the open position and the closed position by a user, even if the user has limited dexterity and using only one hand, because the user can push the lid easily with a single digit, such as a thumb, while applying force in a single direction along arrow T. The lid can be free-moving between the closed position and the open position, and unlocking or use of excessive force is not required.

The lid can move freely into an open position by moving in the direction of arrow L, and the lid can move into the closed position by moving in the direction of arrow W. The lid can have a paddle 342 that can catch the water as the water flows in the direction of arrow W. The paddle 342 can be any number of shapes or protrusions that stick up from the lid into the flow of water. In various embodiments, the paddle 342 can be a lip 142, and/or other various shapes or protrusions that extend up from the lid into the flow of water.

The paddle of the lid can extend out into the flow of water as water is moving in the direction of arrow W. As the water moves around the lure in the direction of arrow W, the water pushes against the paddle 342, thereby pushing the lid in the distal direction. That is to say, the flow of water around the lure is always acting on the paddle to push the lid into a closed position. In this way, the lid can be free moving and without locks or latches, thereby allowing it to be moved easily between the open position and closed position by a single digit, because the lip extends out into the flow of water and the flow of water is constantly pushing the lid into the closed position.

Being free from locks and free from seals also means that water is more able to flow under the lid and out from under the lid, thereby more effectively disseminating the essence of the bait. In various embodiments, a paddle 342, such as lip 142 can be at the proximal end of the lid 140. The lip 142 can extend out into the flow of water and can catch the moving water and direct at least a portion of the water under the lid and past the bait. Having the paddle at the proximal edge of the lid can increase the flow of water that gets caught and directed under the front of lid as the lure flows through the water. This redirection of water by the lip to flow under the lid further improves the dissemination of the essence of the bait out into the ambient water, because it increases the flow of water over the bait.

Figure 4:
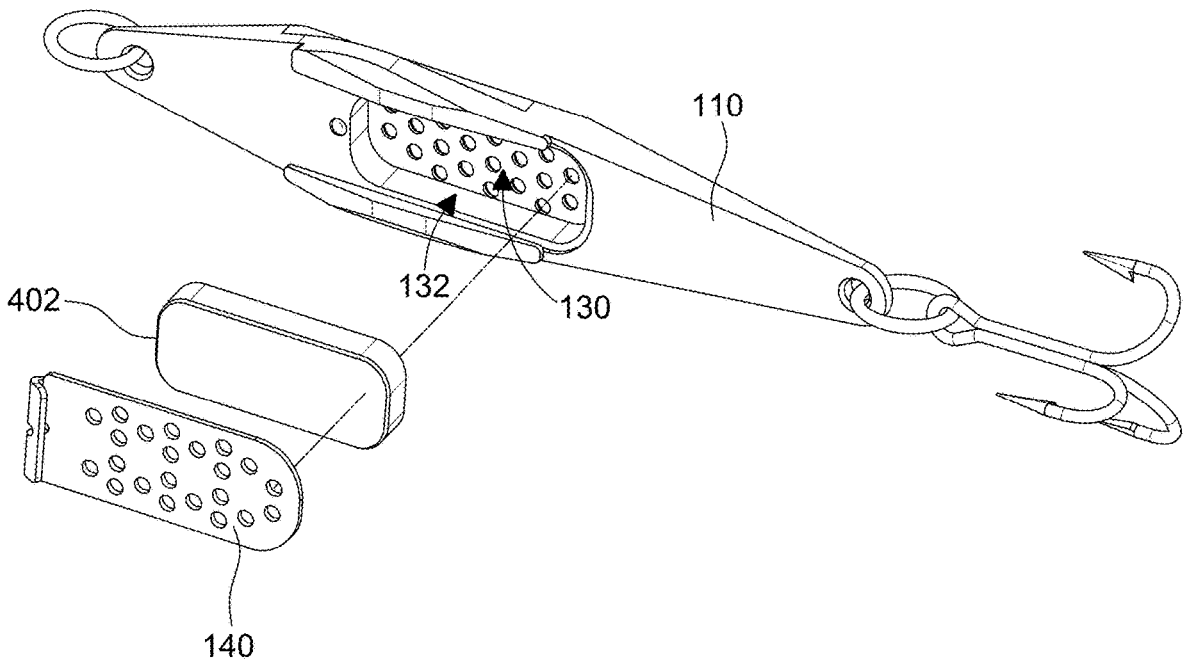
FIG. 4 is an exploded perspective view of a fishing lure with a bait compartment, according to an illustrative embodiment.

FIG. 4 is an exploded perspective view of a fishing lure with a bait compartment, according to an illustrative embodiment. Bait 402 can fit within the cavity 132 and can be held within the cavity by the lid 140. The cavity and the lid can define the bait compartment 130, and the bait can be held securely within the bait compartment. The lure body 110, the bait 402, and the lid 140 are shown separated from each other in an exploded view for clarity, however, it should be clear that the lid can be constrained and bounded in a way that can prevent the lid from becoming separated from the lure body.

In various embodiments, a fishing lure 100 can have a ball detent 410. A ball detent can also be referred to as a spring plunger, as is known to those of skill in the art. The ball detent can include a ball bearing and an encased spring that can provide an upward force to push the ball bearing into the lid 140. The encased spring can provide upward force on the ball bearing that is trapped within the face of the fishing lure. That is to say, the ball bearing has a slightly larger diameter than the detent opening in the face of the lure, so the ball bearing can be forced partly through the opening and can apply pressure to the underside of the lid.

Figure 5:
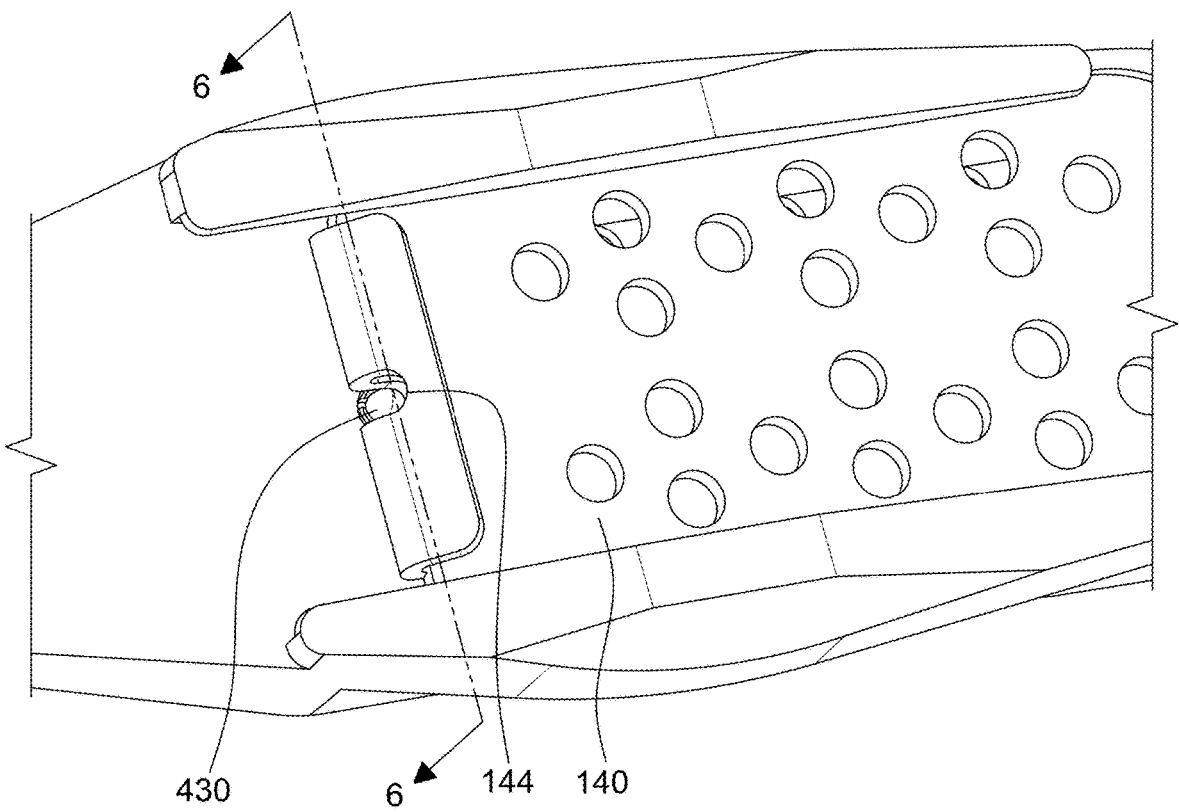
FIG. 5 is a perspective view of a detent securing the lid in the closed position, according to an illustrative embodiment.

FIG. 5 is a perspective view of the detent securing the lid in the closed position, according to an illustrative embodiment. In various embodiments, the ball detent can engage with the notch 144 of the lid 140. When the lid is in the closed position, the ball detent can be pushed into the notch, thereby holding the lid in the closed position. The additional friction provided by the ball detent to hold the lid in the closed position can easily be overcome by pushing the lid with additional force in the proximal direction, or the direction of arrow L. No additional movements or forces are required to open the lid, however, the ball detent 430 can help to hold the lid securely in place, such as during casting.

Figure 6:
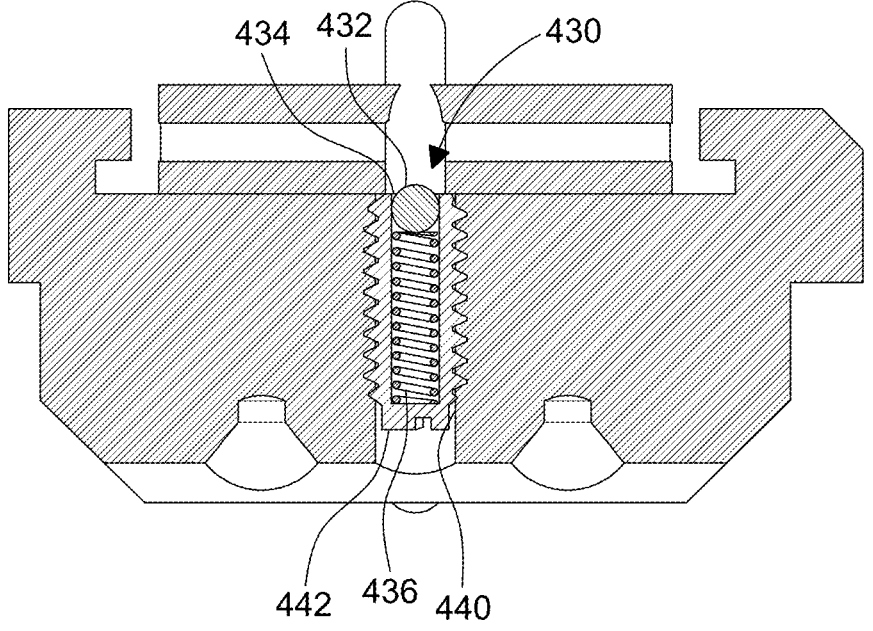
FIG. 6 is a cross section of the fishing lure, taken at cross section line 6-6 of FIG. 5, and showing the inner workings of the ball detent, according to an illustrative embodiment.

FIG. 6 is a cross section of the fishing lure, taken at cross section line 6-6 of FIG. 5, and showing the inner workings of the ball detent, according to an illustrative embodiment. Ball detent 430 can include a ball bearing 432, a detent opening 434 in the face of the fishing lure, and spring 436 pushing the ball bearing partially through the detent opening. The ball detent can be within a threaded hole 440, and an adjustment screw 442 can move in and out within the threaded hole. The threaded hole and screw can allow the user to adjust the pressure the spring can put on the ball bearing. The user can screw the adjustment screw 440 deeper into the threaded hole 442 to increase the pressure the spring puts on the ball bearing, thereby increasing the strength of the ball detent and the force required for the user to overcome the ball detent to move the lid out of the closed position.

Figure 7:
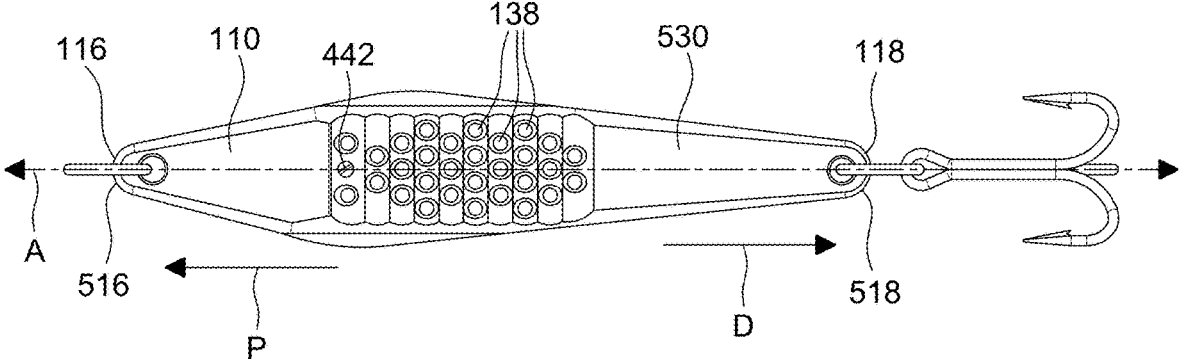
FIG. 7 is a bottom view of a fishing lure with a bait compartment, according to an illustrative embodiment.

FIG. 7 is a bottom view of a fishing lure with a bait compartment, according to an illustrative embodiment. Fishing lure 100 can have a backside 530. detent. Backside 530 can have one or more perforations or holes that allow the essence of the bait, such as taste and/or smell, to escape from the bait compartment. In various embodiments, the backside can have holes 138 that allow the essence of the bait to escape to the water outside of the lure. Holes 138 can be passages in communication between the inside of the bait compartment and the ambient air or water outside of the lure.

Fishing lure 100 can have a lengthwise central axis A that can extend through the center of the lure between the head 116 and the tail 118. Put another way, the lengthwise central axis can extend along the length of the fishing lure, from the proximal end 516 to the distal end 518. Movement of the lid in a proximal direction can be defined as movement towards the proximal end, in the direction of arrow P. Movement of the lid in a distal direction can be defined as movement towards the distal end 518, in the direction of arrow D.

Figure 8:
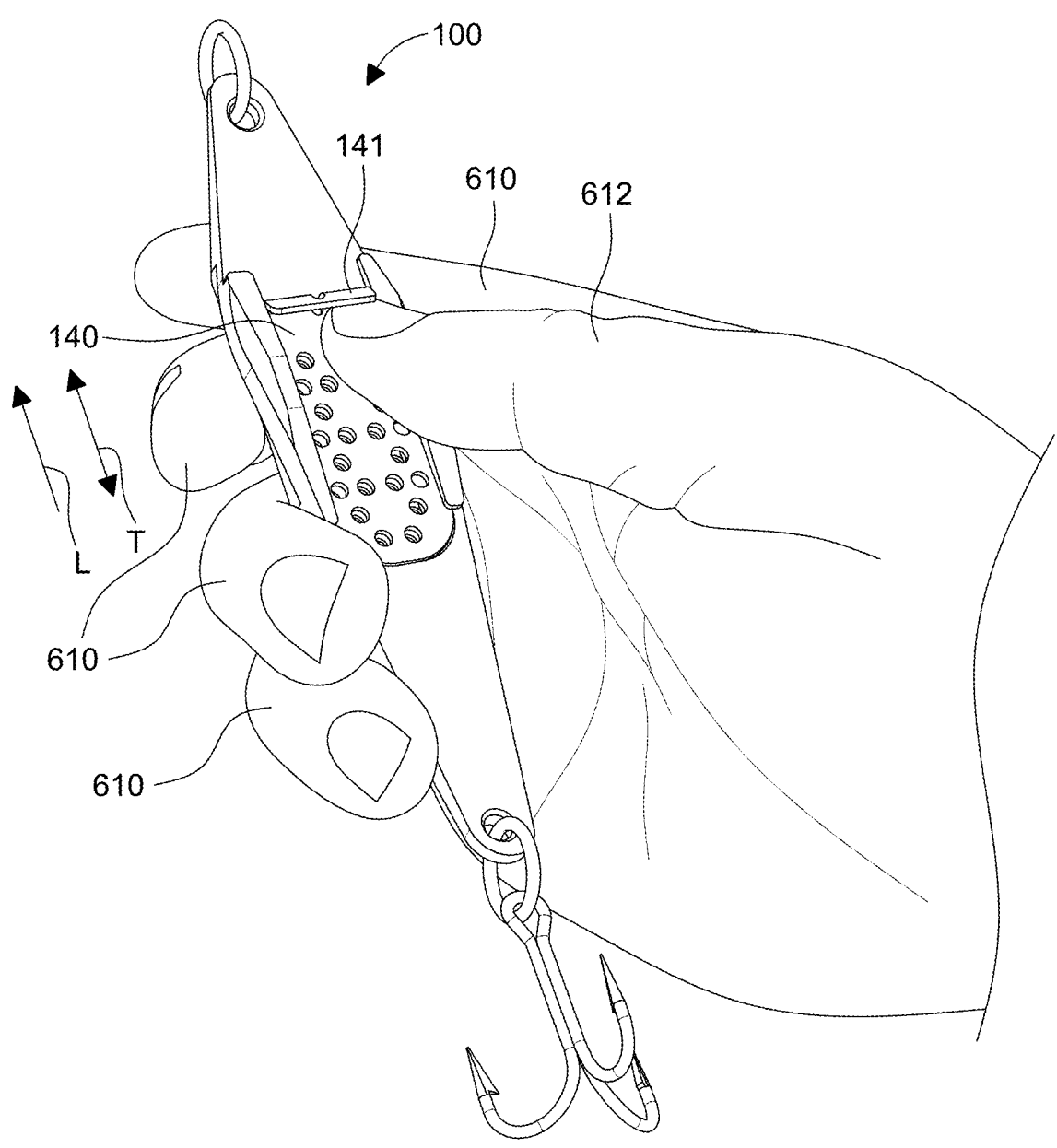
FIG. 8 is a perspective view of a fishing lure being operated with one hand, showing the lure being opened, according to an illustrative embodiment.

FIG. 8 is a perspective view of a fishing lure being operated with one hand, showing the lure being opened, according to an illustrative embodiment. In various embodiments, a user can hold the lure 100 with the fingers 610 of one hand, and can use the thumb 612 to apply force to the grip 141 to slide the lid 140 into an open position. The user can apply force in one single direction, along the direction of travel arrow T. The user can apply force to the grip 141, and the force applied to the grip can be transferred into motion of the lid in an opening direction along arrow L.

Figure 9:
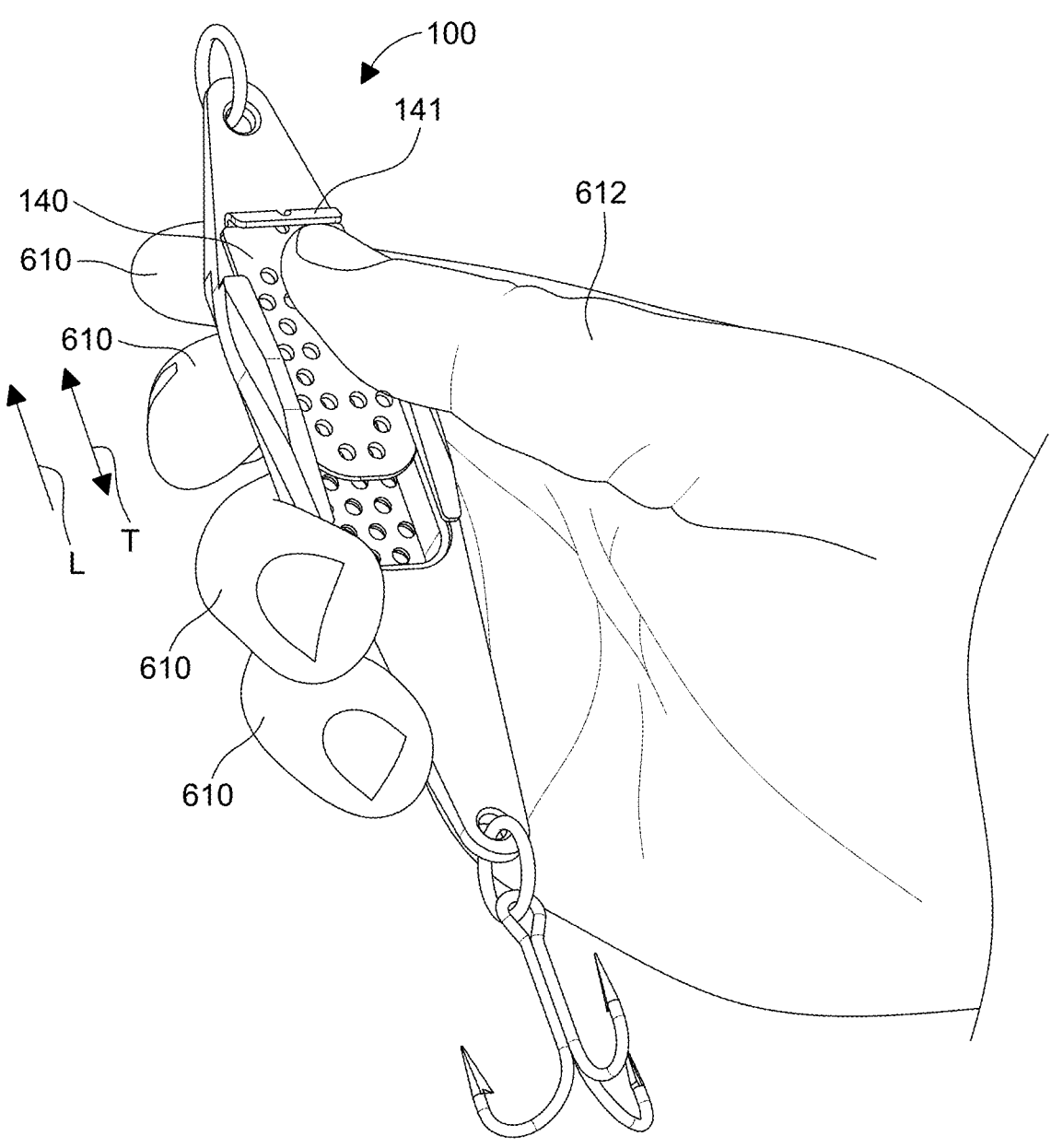
FIG. 9 is a perspective view of a fishing lure being operated with one hand, showing the lure in an open conformation, according to an illustrative embodiment.

FIG. 9 is a perspective view of a fishing lure being operated with one hand, showing the lure in an open conformation, according to an illustrative embodiment. The user can continue to hold the lure 100 in the same position with the fingers 610 of one hand, and can continue to use the thumb 612 to apply consistent force to the grip 141 in the direction of arrow T to slide the lid into an open position. As shown in FIG. 7, the lid has been urged by the thumb of the user into the open position.

Figure 10:
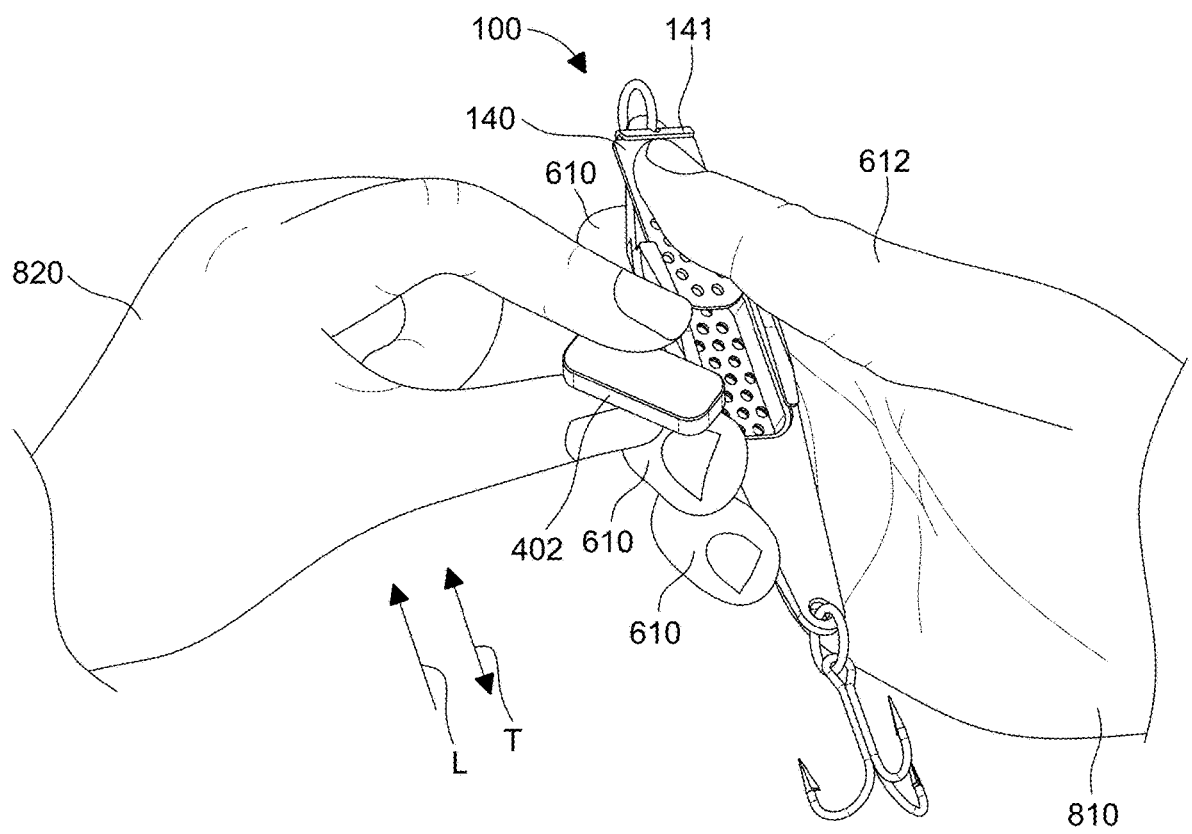
FIG. 10 is a perspective view of a user holding a fishing lure with one hand and using the other hand to place bait in the cavity of the fishing lure, according to an illustrative embodiment.

FIG. 10 is a perspective view of a user holding a fishing lure with one hand and using the other hand to place bait in the cavity of the fishing lure, according to an illustrative embodiment. The lure is now open, and the user can now add bait into the bait compartment with the other hand. That is to say, the first hand 810 has opened the lure 100 and continues to hold the lure 100, and the second hand 820 can place the bait 402 into the cavity of the lure. The user can insert bait into the cavity using only the second hand, while the first hand continues to hold the lure. The first hand 810 can hold the lure continuously throughout the operation that can include opening the lid, loading the bait, and closing the lid.

Figure 11:
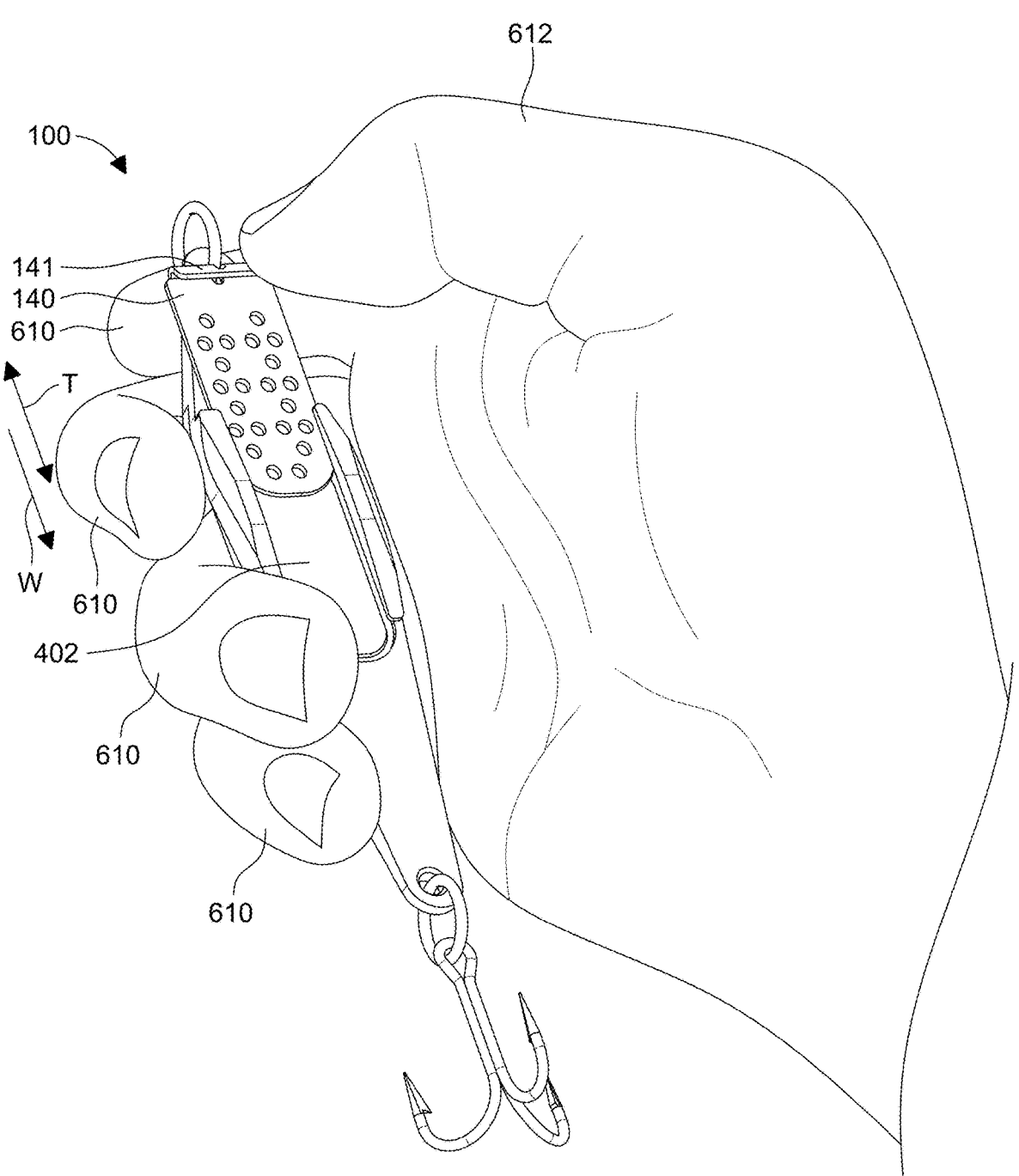
FIG. 11 is a perspective view of a fishing lure being operated with one hand, showing the lure being closed, according to an illustrative embodiment.

FIG. 11 is a perspective view of a fishing lure being operated with one hand, showing the lure being closed, according to an illustrative embodiment. The user can continue to hold the lure 100 with the fingers 610 of one hand, and can use the thumb 612 to apply force to the gip to slide the lid 140 into a closed position. The user can apply force in one single direction, along the direction of travel arrow T. The user can apply force to the grip, and the force applied to the grip can be transferred into motion of the lid in a closing direction along arrow W.

Figure 12:
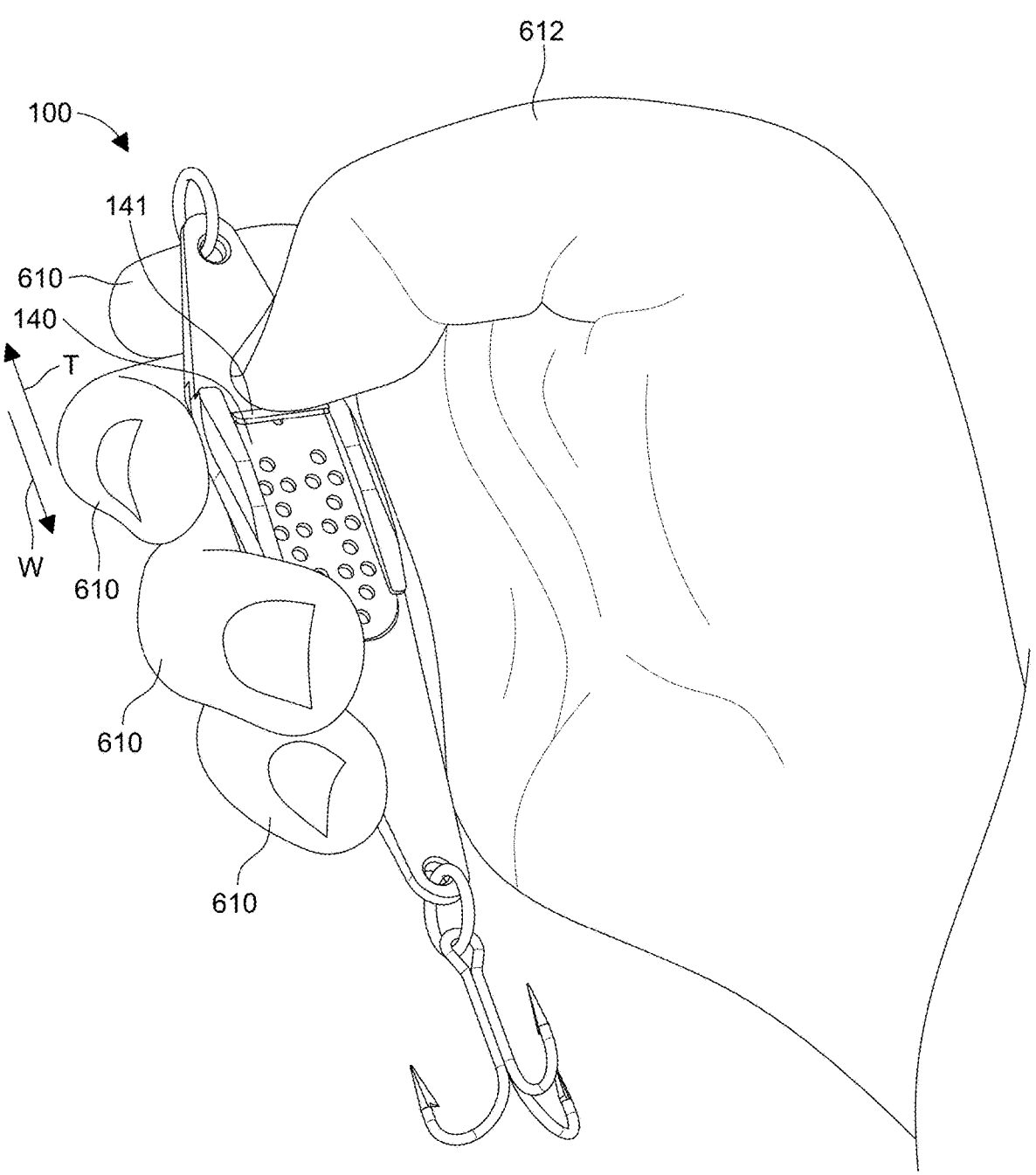
FIG. 12 is a perspective view of a fishing lure being operated with one hand, showing the lure in a closed conformation, according to an illustrative embodiment.

FIG. 12 is a perspective view of a fishing lure being operated with one hand, showing the lure in a closed conformation, according to an illustrative embodiment. The user can continue to hold the lure 100 in the same position with the fingers 610 of one hand, and can continue to use the thumb 612 to apply consistent force to the grip 141 in the direction of arrow T to slide the lid into a closed position. As shown in FIG. 10, the lid has been urged by the thumb of the user in the direction of arrow W into the closed position. The bait is now enclosed in the bait compartment.

The lid can be operated with a single digit by a person with reduced dexterity because the lid is easy to manipulate. The lid only moves in a single dimension along a single axis. The lid does not require unlocking or unlatching to operate, and can simply be slid back and forth between two bounds along a single dimension with a single finger, without the need for excessive force, twisting, or otherwise manipulating the lure.

FIG. 13 shows a method of loading bait into a fishing lure, according to an illustrative embodiment. At box 1302, the user can optionally adjust the force of the ball detent by adjusting the adjustment screw. At box 1304, the user can cradle the fishing lure in the fingers of the user's hand. At box 1306, the user can apply force to the grip of the lid in the proximal direction, thereby moving the lid towards the open position. The user can apply force in one single direction, free from pushing in multiple directions and free from opening latches. Applying force in the proximal direction can include overcoming the ball detent to begin moving the lid towards the open position. At box 1308 the user can slide the lid all the way into the open position. The user can slide the lid all the way into the open position while applying force in the single direction. At box 1320 the user can place bait within the bait compartment of the lid. The user can continue to hold the lure in the first hand, and can place bait into the bait compartment with the second hand. At box 1330, the user can apply force to the grip of the lid in the opposite direction, thereby moving the lid towards the closed position. At box 1332, the user can slide the lid all the way into the closed position. The user can slide the lid all the way into the closed position while applying force in the opposite direction. Sliding the lid into the closed position can include engaging the ball detent within the notch of the lid. At box 1340, the user can cast the lure into a body of water. At box 1342, the user can allow the essence of the bait to dissipate through the holes of the lure into the water around the lure. At box 1344, the user can catch and reel in the game fish that was attracted to the bait.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Also, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 5%) of the system. Accordingly, this description is meant to be taken only by way of example, and not to otherwise limit the scope of this invention.

What is claimed is:

1. A fishing lure comprising:
a slidable lid, the lid movable between an open position and a closed position, the lid partially defining a bait compartment when the lid is in a closed position; and
a lure body, the lure body further comprising a cavity, the cavity partially defining the bait compartment;
a backstop configured to bound the movement of the slidable lid in a distal direction; and
a frontstop configured to bound the movement of the slidable lid in the proximal direction, thereby bounding the movement of the slidable lid to a fixed region in one dimension, preventing the slidable lid from separating from the lure body.

2. The fishing lure of claim 1, wherein the slidable lid is movable in only one dimension, and the lid is constrained from movement in five degrees of freedom.

3. The fishing lure of claim 1, further comprising a ball detent, the ball detent configured to engage with a notch of the slidable lid when the slidable lid is in a closed position, thereby securing the slidable lid in the closed position.

4. The fishing lure of claim 3, further comprising an adjustment screw that adjusts the strength of the ball detent.

5. The fishing lure of claim 1, wherein the slidable lid further comprises a grip adapted to allow a user to apply force along a proximal-distal direction.

6. The fishing lure of claim 1, further comprising two tracks on either side of the bait compartment, the tracks holding the slidable lid in position above the front face of the lure.

7. A fishing lure comprising:
a slidable lid, the lid movable between an open position and a closed position, the lid partially defining a bait compartment when the lid is in a closed position;
a lure body, the lure body further comprising a cavity, the cavity partially defining the bait compartment; and
two tracks on either side of the bait compartment, the tracks holding the slidable lid in position above the front face of the lure.

8. The fishing lure of claim 7, wherein the slidable lid is movable in only one dimension, and the lid is constrained from movement in five degrees of freedom.

9. The fishing lure of claim 7, further comprising a backstop configured to bound the movement of the slidable lid in a distal direction.

10. The fishing lure of claim 7, further comprising a ball detent, the ball detent configured to engage with a notch of the slidable lid when the slidable lid is in a closed position, thereby securing the slidable lid in the closed position.

11. The fishing lure of claim 10, further comprising an adjustment screw that adjusts the strength of the ball detent.

12. The fishing lure of claim 7, wherein the slidable lid further comprises a grip adapted to allow a user to apply force along a proximal-distal direction.

* * * * *